Patented Feb. 7, 1928.

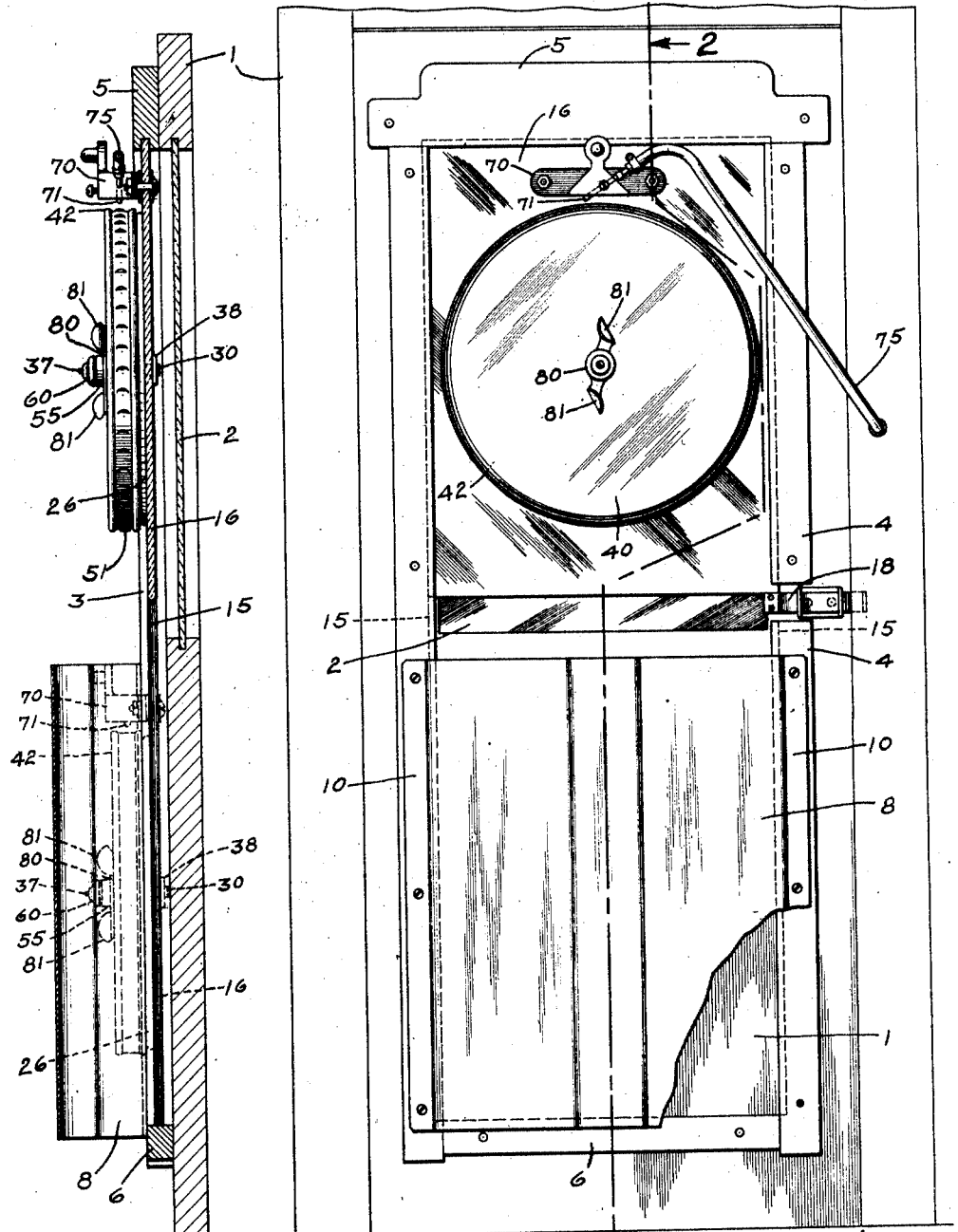

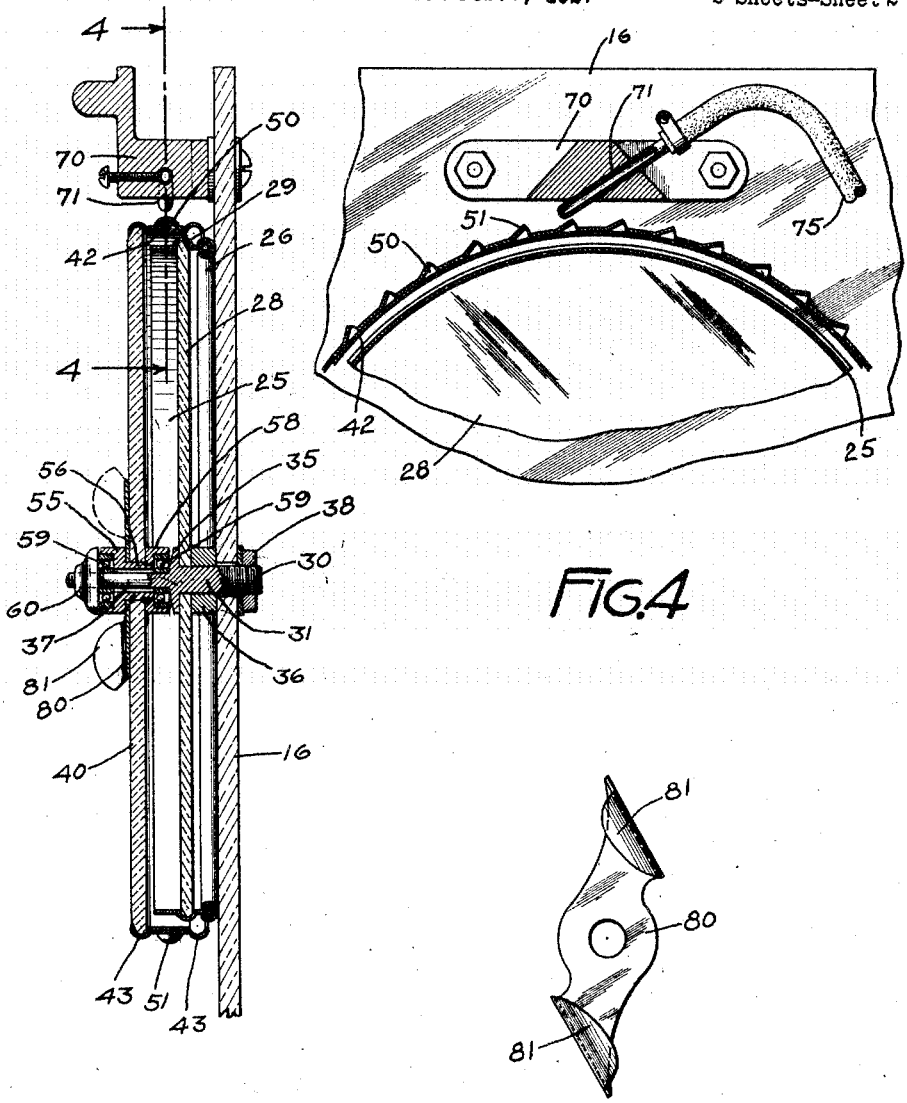

1,658,172

UNITED STATES PATENT OFFICE.

CARL W. OLSON, OF MINNEAPOLIS, MINNESOTA.

ROTARY CLEAR-VISION SHIELD.

Application filed February 7, 1927. Serial No. 166,529.

This invention relates to a device for preventing the deposit of moisture upon glass or similar transparent material. Devices of this general nature are used on windshields, locomotive cab windows, streetcar windows, or in similar locations where it is desired to obtain and maintain clear vision.

Objects of the invention are to provide means attachable at the outside of the glass or window, and adapted to cover and protect a predetermined area of such glass, in a manner to prevent entrance of rain within the area, and to prevent deposit of mosisture upon a certain rotatably mounted transparent element, which forms a cover for and protectingly encircles a non-air tight element.

It has been found that in order to substantially prevent the deposit of moisture on the outside of the rotatable transparent element, it is necessary to rotate the cover at a very high velocity, ordinarily at approximately two thousand revolutions a minute. This velocity is too great and glass is often broken. I have found, however, that if a current of air is brought across the outer surface in a certain manner, the velocity of rotation can be reduced to prevent breakage of glass, and at the same time, the dry condition of the element can be maintained. For this purpose, I provide a small fan or vane having wings disposed substantially perpendicularly to the face of the transparent element, the vane being attached centrally of the rotating element to move at an equal velocity therewith. The fan is arranged to force the air in the same direction as the rotation of the transparent element.

Features of the invention include an annular boxing blocking off or circumscribing a predetermined area of the glass; the provision of a glass cover for the boxing, as a rotating element, overhanging but spaced from the periphery of the boxing; the provision of a transparent or non-transparent air vane or vanes, rotatable with the transparent disk, and adapted to project a sheet of air across the outer surface of the rotating element in direction of rotation of said element; the provision of peripheral pockets upon said rotating element, as well as means for directing a current of air into said pockets to rotate the element; the provision of a protective pocket into which the vision shields may be lowered when not in use, said pocket being open at the top and bottom to prevent accumulation of dust or snow; of the details of construction both of the device and its mounting including the broader as well as the more specific features, and combinations and subcombinations of the elements.

Objects and other features of the invention will be set forth in the description of the drawings forming a part of this application and in said drawings, Figure 1 is a front view showing the device mounted in its casing or door;

Figure 2 is vertical section substantially on line 2—2 of Figure 1;

Figure 3 is an enlarged vertical section through the clear vision device;

Figure 4 is a detailed vertical section on line 4—4 of Figure 3 showing the construction of the pocketed rim; and Figure 5 is a detail view of the air vane or fan.

The invention is shown applied to the cab door of a railway locomotive. The numeral 1 designates the door having a window 2 in its upper portion, and further having a frame attached at its outer side comprising a pair of vertical parallel guides 3—4. The latter guide being composed of two pieces, the ends of which are spaced as shown to provide a gap to receive a detent to be described below. The frame is completed by a grooved top piece 5 as well as with a bottom stop bar 6. These elements form a frame which surrounds the windows, the parts of the frame being suitably secured, as by screws, at each side of, above and below the window. The pocket 8 is provided below the window, and is herein formed of a sheet of metal bent to provide a central vertical channel for receiving and protectingly housing certain portions of the vision shield. The pocket-forming plate is attached as by flanges 10 to the vertical frame elements 3 and 4 and has its open upper end lying directly below the lower end of the window opening.

The side pieces 3—4 are grooved as at 15 and have slidably arranged therein what I herein term a shield base plate 16 which is slidable within grooves 15, and when in normal position has its upper edge engaged within the groove of the upper cross piece 5. Thus the base plate may be raised or lowered, and a slidable stop or latch 18 is arranged between the adjacent ends of the guides 4 as shown in Figure 1 having its bolt member projecting beneath the lower end of the transparent base plate to positively hold the same in uppermost position. The frame element 4 is in two pieces. This latch is also adapted to engage the upper edge of the base plate when the same is in storage position in the protective pocket.

A certain area of the plate 16 is blocked off or circumscribed by an annular member 25 having a beaded periphery formed by a section of split rubber tubing 26, see Figure 3. The tubing is adapted to engage the base plate and to sealingly close the annular member at that side, the opposite end of the member being open. The glass disk 28 is sealingly secured within a groove or bead 29 projecting outwardly beyond the periphery of the annular member and forming the groove at the inner side. A post 30 has an inner stem portion 31 traversing the disk 28 and base plate 16 as shown. This post has an integral flange 35 engaging the disk as a stop at the outer side, and a spacer 36 is interposed between the disk 28 and plate 16. A nut 38 is threaded on the shank 31 to clamp the rubber bead of the annular member in sealing position. The post is reduced as at 37 to provide a journal and support for a transparent cover member 40, which is rotatably mounted on the extension, and has a rim 42 encircling but spaced from the annular member 25 to prevent entrance of moisture but to permit circulation of air within the chamber formed by the annular member. The rim 42 also has the form of an annulus and is provided at opposite edges with beads 43, the outer bead forming a socket for receiving the glass disk 40, and the inner bead providing a guard to prevent entrance of water between the disks. The bead 29 also acts to prevent any water which may reach the outer surface of the annulus 25, from reaching the inner surface. The annular member 42 is provided centrally and circumferentially with pockets 50 which in this instance are formed in a strip 51 secured as by welding to and around the outer surface of the member 42. The disk is held for rotation on the extension 37 by a ball bearing comprising an outer ball race container 55, having a tubular extension 56 passing through the disk 40, the said extension being threaded exteriorly. The second container 58 is threaded on to this extension as shown and clamps the parts to the disk. In each cup member is fitted a ball bearing 59. A nut 60 holds the ball bearing hub and containers in operative position.

Mounted upon the plate 16 above the rim 42 is a pocket 70 having arranged therein a nozzle 71 suitably arranged for delivering fluid into the pockets 50. A delivery connection 75 is shown which may be connected with the air line, as when the device is used on a locomotive.

The device as thus set up includes a circumscribed area sealed against the entrance of moisture and capped or covered by a rotatable element spaced therefrom to permit free circulation of air within the box or ring-like element and provides means whereby the cover disk may be rotated at greater or lesser velocities according to the amount of moisture to be dissipated. Under certain conditions the device may be used without further additions, particularly where high rotative velocities are unnecessary. However, if, as has been found under certain conditions, it is necessary to rotate the disk at very high velocities to obtain and maintain the clear vision, I provide for the generation of a current of air across the outer face of the disk substantially parallel and across the face, and in direction of rotation. This means comprises an element 80 as a vane or fan clampingly secured between the element 55 and the front face of the disk 40 as best shown in Figure 3. This breeze-producing element is substantially diametrically arranged as shown and the blades 81 project in a direction perpendicular to the face of the disk and are curved and arranged in tangent relation to a circle having its center in the axis of rotation of the disk. By these means, a current of air can be made to pass across the disk toward its outer periphery. It will be noted that the current runs in a direction of rotation; that is, that it is projected in direction of rotation. The device provides means whereby the velocity of rotation can be materially reduced to reduce the liability of breakage while at the same time clear vision can be maintained as efficiently as when the disk is run at greater velocities.

I claim as my invention:

1. A device of the class described, comprising a transparent base and annular member sealingly secured by one edge against the base, a transparent member mounted at the outer side of the annular member and arranged to prevent entrance of moisture but to permit circulation of air therewithin, and a vane rotatable with said transparent rotatable element at its outer side, the blades of the vane being arranged to force air across the surface of the element in direction of its rotation.

2. A device of the class described including a transparent plate, an open end annular element sealingly engaged by one edge thereagainst, a transparent disk engaging within the annular element, a journal member acting to clamp the annular element against the plate and a transparent disk rotatably mounted on said journal member and having a rim encircling the annular element.

3. A device of the class described including a transparent plate an open end annular element sealingly engaged by one edge thereagainst, a transparent disk sealingly secured within the annular element, a journal member traversing plate and disk and clamping the annular element against the plate and, a transparent disk rotatably mounted upon the journal, and having a rim encircling the annular element.

4. A device of the class described including a transparent base and an annular member sealingly secured to the base to prevent entrance of water, and a transparent cover for said annular member rotatably mounted spaced therefrom and having a rim overlapping and encircling the annular member to permit circulation of air therewithin, and a vane attached centrally to the cover at the outer side and adapted to direct a current of air across the face of said cover.

5. A cover member for the purpose described having a breeze producing vane attached to and movable therewith substantially at its center and arranged to direct a current of air across its face.

6. A cover member for the purpose described having a breeze producing vane attached to and movable therewith substantially at its center, and arranged to direct a current of air across its face in direction of rotation of the cover member.

7. A device of the class described comprising a transparent base, an annular member having an outwardly projecting circumferential intermediately arranged groove and a tubular element having one end sealingly engaging the base, a disk sealingly secured within the groove, a post transversing the base and disk and clampingly securing the annular member against the base, and a transparent cover member rotatably mounted on the post, and having a rim encircling but spaced from the annulus, said rim having pockets exteriorly.

8. A device of the class described comprising a frame having guide grooves therein, a transparent base slidable in said grooves, an annular member having one end sealingly engaging the base a transparent element rotatably mounted at the outer side of the annular member in spaced relation thereto and having a rim encircling the annular member to prevent entrance of moisture but to permit circulation of the air within said member, said rim having pockets exteriorly, a nozzle mounted upon said base and arranged to deliver fluid into the pockets, and said frame having a storage receptacle arranged, and adapted to receive the base and elements thereon, and protect the same.

9. A device of the class described comprising a base, an annular member having an outwardly projecting circumferential groove, a tubular element carried by the annular member sealingly engaging the base, a disk sealingly secured within the groove, a post transversing the base and plate centrally and clampingly securing the annular member against the base, said post having a forward extension, and a transparent member rotatably mounted on the extension and having a rim encircling the annulus.

10. A device of the class described comprising a frame having guide grooves therein, a transparent base slidable in said grooves, and an annular member secured against the base, a transparent cover element rotatably mounted at and spaced from the outer side of the annular member in spaced relation thereto and having a rim encircling the annular member to prevent entrance of moisture but to permit circulation of the air within said member, said rim having pockets exteriorly, a nozzle mounted upon said base and arranged to deliver fluid into the pockets, and said frame having a storage receptacle arranged and adapted to receive the base and elements thereon, and protect the same.

11. A device of the class described comprising a transparent base and annular member sealingly secured by one edge against the base, a transparent member mounted at the outer side of the annular member and arranged to prevent entrance of moisture but to permit circulation of air therewithin, and a vane rotatable with said transparent rotatable element and its outer side, the blades of the vane being arranged to force air across the surface of the element in direction of its rotation.

In witness whereof, I have hereunto set my hand this 3rd day of February, 1927.

CARL W. OLSON.